United States Patent [19]

Girardeau, Jr.

[11] Patent Number: 5,128,890
[45] Date of Patent: Jul. 7, 1992

[54] APPARATUS FOR PERFORMING MULTIPLICATIONS WITH REDUCED POWER AND A METHOD THEREFOR

[75] Inventor: James W. Girardeau, Jr., Toulouse, France

[73] Assignee: Motorola, Inc., Schaumburg, Ill.

[21] Appl. No.: 696,407

[22] Filed: May 6, 1991

[51] Int. Cl.⁵ .............................................. G06F 7/52
[52] U.S. Cl. ..................................... 364/757; 364/754
[58] Field of Search ................... 364/757, 754, 707

[56] References Cited

U.S. PATENT DOCUMENTS 4,891,779  1/1990  Hasebe ............................. 364/754

Primary Examiner—Tan V. Mai
Attorney, Agent, or Firm—Paul J. Polansky

[57] ABSTRACT

An apparatus for performing multiplications with reduced power includes an arithmetic logic unit and a decode block for performing an equivalent of a multiply instruction. A frequently-encountered multiply instruction occurs between a variable and a known constant. If the known constant is positive or negative one, the decode block enables the arithmetic logic unit to either add the variable to zero, or subtract the variable from zero, in response to the sign bit of the known constant. In response to a mulitply and accumulate instruction between a variable and a known constant of positive or negative one, the decode block enables the arithmetic logic unit to either add the variable to the prior accumulated result or to subtract it therefrom, in response to the sign bit of the known constant. In either case, a high-speed multiplier is disabled and its power saved.

8 Claims, 6 Drawing Sheets

APPARATUS FOR PERFORMING MULTIPLICATIONS WITH REDUCED POWER AND A METHOD THEREFOR

FIELD OF THE INVENTION

This invention relates generally to data processors, and more particularly, to a method and apparatus for performing multiplications with reduced power.

BACKGROUND OF THE INVENTION

Certain integrated circuit microprocessors have long included an internal program, known generally as microcode, which executes external instructions provided by the user. The microcode is stored in an internal memory array. The microprocessor executes the microcode through logic including a program counter which accesses into the microcode memory array. The program counter logic receives an external instruction and then accesses a microcode entry or jumps to a microcode routine to execute the external instruction. The program counter logic includes mechanisms for waits, conditional jumps, and sequencing of instructions stored in the microcode, also known as microinstructions or simply instructions. The microprocessor stores data in internal registers, known collectively as the execution unit, and moves data internally using data paths. In addition, the microprocessor has hardware for performing arithmetic instructions, such as additions, multiplications, shifts, and the like.

When the program counter logic accesses an entry in the microcode, it provides a data element, known as a microinstruction, which includes fields defining hardware to be enabled, data to be moved, etc. The fields are encoded, and a decoder is necessary to convert the field into control signals which enable and disable the hardware for operation. When the user provides an external arithmetic instruction, the microcode causes data to be moved via the internal data paths to the arithmetic hardware and activates appropriate portions of the arithmetic hardware to perform the external instruction.

For example, when the microcode provides a multiply microinstruction, fields in the microinstruction cause the operands to be moved via the internal data paths and to be provided as inputs to a hardware multiplier. Conventional hardware multipliers, such as Booth's multipliers and array multipliers, are known to provide high speed operation and are frequently used in microprocessor design. It is important to include a high-speed multiplier in microprocessor designs because microprocessors typically consume a large amount of time executing such instructions. However, the high-speed multipliers also consume much power and thus present a limitation to the operation of microprocessors which are required to operate in low-power environments, such as battery-backup systems. In addition, some environments such as digital signal processing in telecommunications systems rely on algorithms which are computation-intensive, requiring a large number of multiply instructions.

SUMMARY OF THE INVENTION

Accordingly, there is provided, in one form, an apparatus for performing multiplications with reduced power, comprising an arithmetic logic unit for either, adding first and second inputs, or subtracting the second input from the first input, in response to first and second predetermined states of first and second control signals, respectively, when enabled, means for providing both a first operand of the multiplication as the first input of the arithmetic logic unit, and a binary zero as the second input of the second arithmetic logic unit, in response to a multiply instruction in which the second operand is equal to either positive one or negative one; and decode means for providing the first and second control signals either in the first or the second predetermined logic states respectively in response to a sign bit of the second operand, and enabling the arithmetic logic unit in response to a multiply instruction in which the second operand is equal to either positive one or negative one.

In another form, a method is provided for performing multiplications with reduced power, the multiplications performed between first and second operands, comprising the steps of detecting a multiplication instruction in which the second operand has a value of positive one or negative one; providing the first operand as a second input to an arithmetic logic unit; providing zero as a second input to the arithmetic logic unit; enabling the arithmetic logic unit for either addition or subtraction respectively in response to a positive or a negative value of a sign bit of the second operand; activating the arithmetic logic unit; and providing an output of the arithmetic logic unit as a result of the multiplication.

These and other features and advantages will be more clearly understood from the following detailed description taken in conjunction with the accompanying drawings.

DETAILED DESCRIPTION OF THE INVENTION

Figure 1:
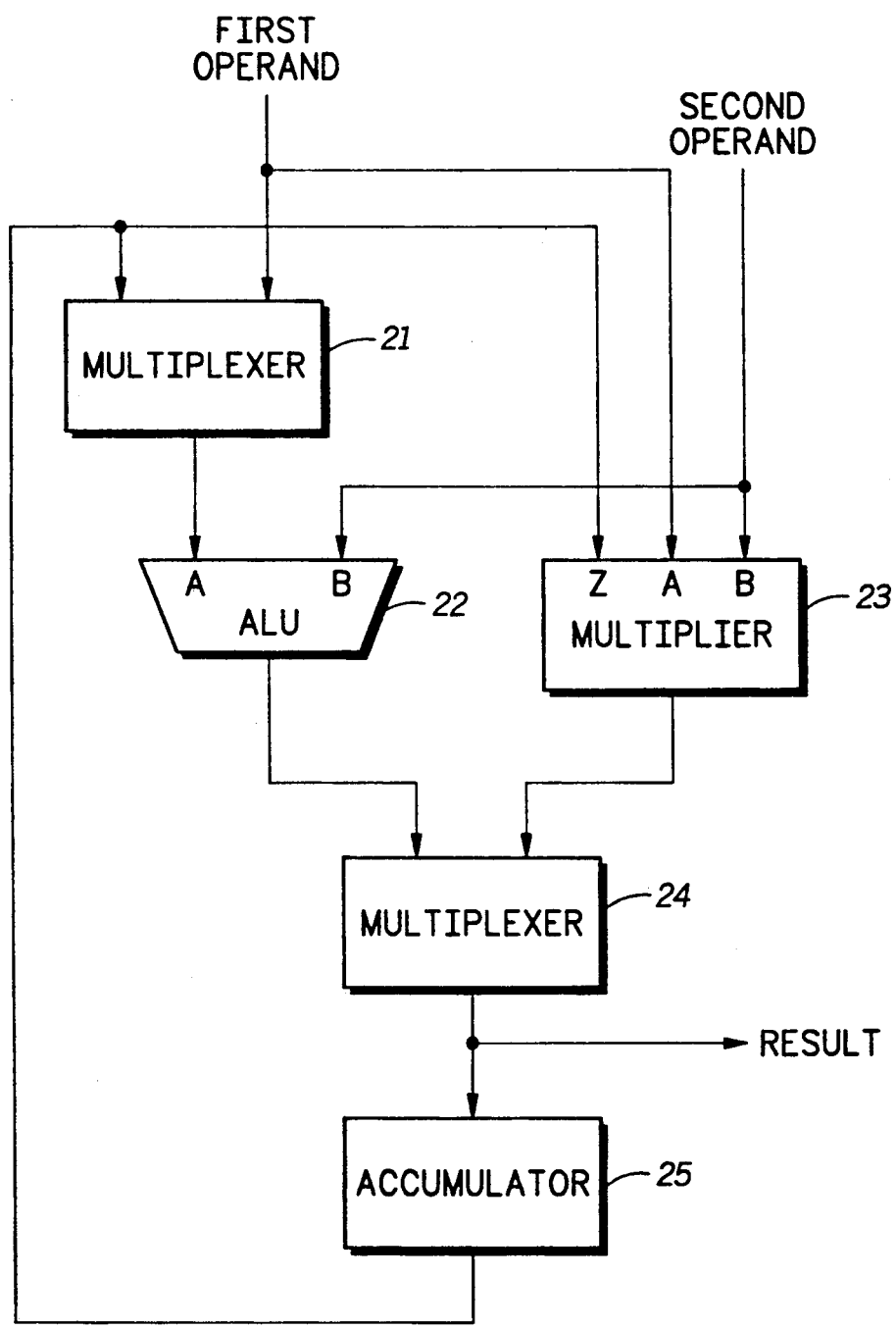
FIG. 1 illustrates in block form an arithmetic unit for performing multiply instructions known in the prior art.

FIG. 1 illustrates in block form an arithmetic unit 20 for performing multiply instructions known in the prior art. Arithmetic unit 20 includes a multiplexer 21, an arithmetic logic unit (ALU) 22, a multiplier 23, a multiplexer 24, and an accumulator 25. Multiplexer 21 has two inputs; a first input is coupled to the output of accumulator 25, and a second input receives a data element labelled "FIRST OPERAND". Multiplexer 21 has an output which is received as a first input, or "A input", of ALU 22. ALU 22 receives a data element labelled "SECOND OPERAND" at a second input, or "B input", terminal, and has an output. Multiplier 23 has an A input for receiving the FIRST OPERAND, a B input for receiving the SECOND OPERAND, a third input, or "Z input", coupled to the output of accumulator 25, and an output. Multiplexer 24 has first and second inputs respectively coupled to the outputs of ALU 22 and multiplier 23, and an output labelled "RESULT" provided as an input of accumulator 25.

Control signals of the various elements are not illustrated in FIG. 1 but will be apparent from a description of the operation of arithmetic unit 20. Multiplexer 21 is included to allow the A input of ALU 22 to be either the FIRST OPERAND or the output of accumulator 25, which represents the result of a prior operation. ALU 22 is a conventional arithmetic logic unit which performs a variety of operations including addition, subtraction, negation, absolute value, left and right shift, and logic operations such as exclusive OR, between the A and B inputs. Multiplier 23 is a conventional high-speed multiplier such as a Booth's multiplier or an array multiplier, which performs a multiplicaton between the A and B inputs. In addition, multiplier 23 includes a Z input which represents a prior product and to which the product of the A and B inputs may be added if enabled. Multiplexer 24 selects either the output of ALU 22 or the output of multiplier 23 to provide as RESULT. Accumulator 25 is a register which provides RESULT at its output for potential use in a subsequent operation.

Arithmetic unit 20 is suited for performing a variety of arithmetic operations as part of a data processor such as an integrated circuit microprocessor. In response to a microinstruction indicating an arithmetic instruction, a decoder, not shown in FIG. 1, decodes a field of the microinstruction to provide control signals to the various elements of arithmetic unit 20. If the microinstruction indicates an addition between two data elements, provided as FIRST OPERAND and SECOND OPERAND, then the decoder selects the second input of multiplexer 21 to be provided as the A input of ALU 22, provides a control signal indicating to ALU 22 that an addition is to be performed, and selects the first input of multiplexer 24 to provide as RESULT.

If the microinstruction indicates a multiplication, then different elements are enabled. A control signal is provided to multiplier 23 to indicate that a multiplication between the A and B inputs is to take place, and multiplier 23 is enabled. A control signal also indicates that the second input of multiplexer 24 is to be provided as RESULT. If the microinstruction indicates a multiply with accumulate instruction, then a control signal is provided to multiplier 24 to indicate that a multiplication between the A and B inputs is to take place and the result is to be added to the Z input. A control signal also indicates that the second input of multiplexer 24 is to be provided as RESULT. In a typical algorithm, a multiply and accumulate instruction is performed repetitively; thus, RESULT of a cycle is stored in accumulator 25 and becomes the Z input of a multiplication which occurs in a subsequent cycle.

Arithmetic unit 20 performs a variety of arithmetic operations including multiply and multiply and accumulate instructions. When either a multiply or multiply-and-accumulate instruction is to be performed, high-speed multiplier 23 is used. The architecture of arithmetic unit 20 is well-suited to applications in which a high-speed multiply operation is desirable and in which power consumption is not important. However, arithmetic unit 20 presents a problem in applications in which a high-speed multiply operation is desirable but in which low power consumption is also important, especially if the application is also computation-intensive.

Figure 2:
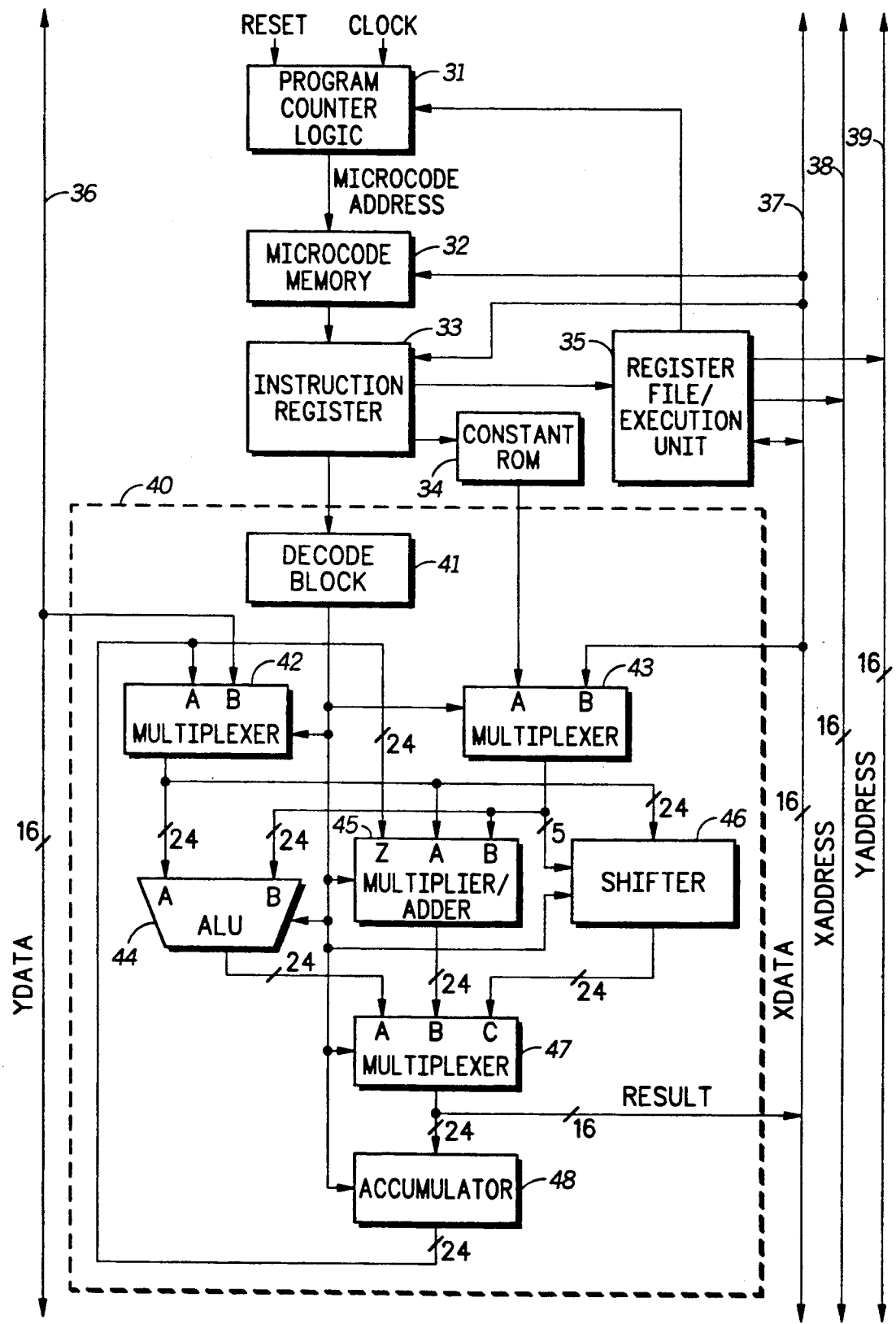
FIG. 2 illustrates in block form a data processor including an arithmetic unit for performing multiplications with reduced power in accordance with a preferred embodiment of the present invention.

FIG. 2 illustrates in block form a data processor 30 including an arithmetic unit 40 for performing a multiplication with reduced power in accordance with a preferred embodiment of the present invention. Data processor 30 includes generally a program counter logic block 31, a microcode memory 32, an instruction register 33, a constant read only memory (ROM) 34, a register file/execution unit 35, a data path labelled "YDATA", a data path labelled "XDATA", an address bus labelled "XADDRESS", an address bus labelled "YADDRESS", and arithmetic unit 40. Arithmetic unit 40 further includes a decode block 41, a multiplexer 42, a multiplexer 43, an arithmetic logic unit (ALU) 44, a multiplier/adder 45, a shifter 46, a multiplexer 47, and an accumulator 48.

Program counter logic block 31 receives a clock signal labelled "CLOCK" and a reset signal labelled "RESET", is coupled to register file/execution unit 35, and provides an output labelled "MICROCODE ADDRESS". Microcode memory 32 receives MICROCODE ADDRESS and has an input coupled to the XDATA path. Instruction register 33 is coupled to microcode memory 32 and has an input coupled to the XDATA path. Constant ROM 34 has an input coupled to instruction register 33, and provides an output to arithmetic unit 40. Register file/execution unit 35 has an input coupled to instruction register 33, and is coupled to the XDATA path, and provides outputs to program counter logic block 31, XADDRESS, and YADDRESS.

In arithmetic unit 40, multiplexer 42 has a first or A input connected to the output of accumulator 48, a second or B input coupled to the YDATA path, and an output. Multiplexer 43 has an A input coupled to constant ROM 34, and a B input coupled to the XDATA path, and an output. ALU 44 has an A input for receiving the output of multiplexer 42, a B input for receiving the output of multiplexer 43, and an output. Multiplier/adder 45 has an A input coupled to the output of multiplexer 42, a B input coupled to the output of multiplexer 43, a Z input coupled to the output of accumulator 48, and an output. Shifter 46 has an input for receiving the output of multiplexer 42, a shift control input for receiving a portion of the output of multiplexer 43, and an output. Multiplexer 47 has an A input, a B input, and a third or C input respectively coupled to the outputs of ALU 44, multiplier/adder 45, and shifter 46, and an output for providing RESULT to the XDATA path. Accumulator 48 has an input coupled to the output of multiplexer 47, the output of which provides the second input of multiplexer 42 and the Z input of multiplier/adder 45. Decode block 41 is coupled to instruction register 33, and is coupled to multiplexer 42, multiplexer 43, ALU 44, multiplier/adder 45, shifter 46, multiplexer 47, and accumulator 48.

Data processor 30 receives external instructions as part of an external program. In response to each external instruction, data processor 30 performs a corresponding routine of a microprogram, which is stored in microcode memory 32. Each line or address of microcode memory 32 stores a microinstruction (also referred to as simply "instruction"). A microassembler provides the sequence and coding of microinstructions that are to be performed in response to each external instruction. This microassembler is to be distinguished from an external assembler, which encodes the external instructions to be provided to data processor 30.

Data processor 30 has two data paths, the XDATA path and the YDATA path, accessed respectively by XADDRESS and YADDRESS. Program counter logic 31 provides addresses to access into microcode memory 32. When RESET is activated, program counter logic 31 resets to a known starting address in microcode memory 32. When RESET is deactivated, program counter logic block 31 begins to sequentially access into microcode memory 32, with clocking information being provided by the CLOCK signal. Register file/execution unit 35 provides indications, such as condition codes, of which action program counter-logic 31 should take at the next CLOCK cycle, such as wait, jump, and increment MICROCODE ADDRESS. Microcode memory 32 includes both a microprogram stored in read only memory (ROM), and memory to store an external instruction received when data processor 30 accesses external program memory via the XDATA path. When a microinstruction is accessed, it is stored in instruction register 33 until another microinstruction is accessed. Instruction register 33 provides appropriate fields of the microinstruction to various blocks in data processor 30, including register file/execution unit 35, constant ROM 34, and decode block 41. These fields are encoded fields of the microinstruction which must be further decoded by a selected hardware block.

If an arithmetic operation is to be performed, decode block 41 detects the operation and provides control signals to the various blocks in arithmetic unit 40 in response. For example, an addition is to be performed between a first operand from the YDATA path and a second operand from the XDATA path. Decode block 41 provides control signals to multiplexer 41 to select the first input, and data from the YDATA path is provided as the A input of ALU 44. Similarly, decode block 41 provides control signals to multiplexer 43 to select the second input, and data from the XDATA path is provided as the B input of ALU 44. Decode block 41 indicates to ALU 44 that an addition is to be performed, and activates ALU 44. Decode block 41 provides control signals to indicate to multiplexer 47 that the first input thereof, namely the output of ALU 44, is to be provided as RESULT.

However, because of the possibility of overflow, the outputs of ALU 44 and multiplier/adder 45 are 24 bits. While only the lower-order 16 bits are provided as RESULT to the XDATA path, the extra eight bits are provided as an extension word or are represented as condition codes after the completion of the operation. The outputs of ALU 44, multiplier/adder 45, and shifter 46 are 24-bit data elements, while RESULT and the XDATA and YDATA paths are 16 -bit. The extra bits result from overflow if the operands are too large, which represents a condition code result of the operation. While the use of the extra bits is not illustrated in FIG. 2, such uses are known and do not affect the current invention. In the illustrated embodiment, the YDATA path is typically used to access variables, and the XDATA path is typically used to access constants.

In some applications, such as computation-intensive digital signal processing for telecommunications operations, algorithms use frequent multiplications between variables and constants. A multiplication between a variable and some common constants used in these applications can be reproduced by algorithms that don't require the use of a power-intensive multiplier. In accordance with the present invention, arithmetic unit 40 performs multiplication operations with reduced power by selectively utilizing its own arithmetic resources to perform a portion of the multiplication operations without using conventional, high-speed multiplier/adder 45.

Figure 3:
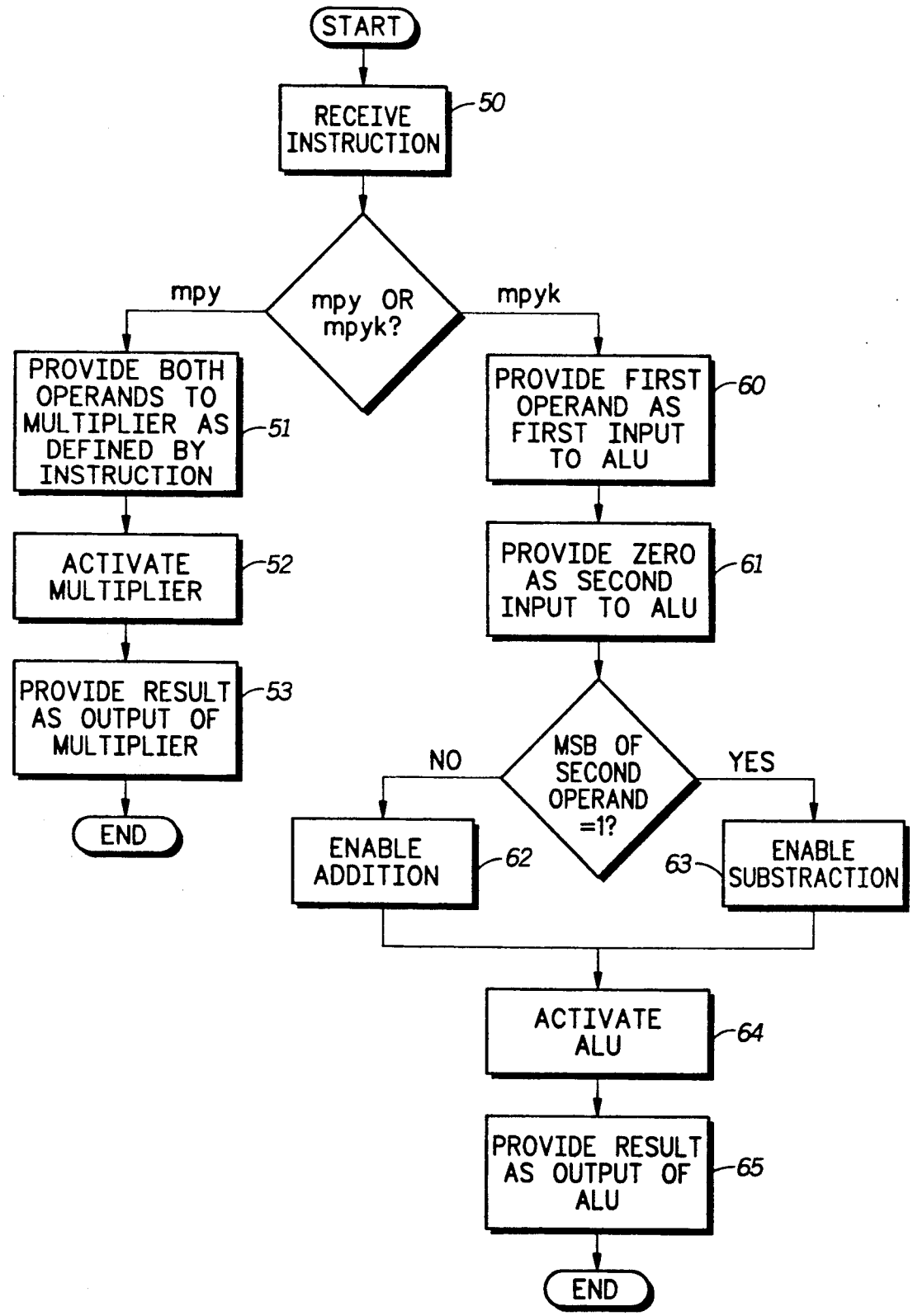
FIG. 3 illustrates a flow chart of a multiply instruction associated with the arithmetic unit of FIG. 2.

FIG. 3 illustrates a flow chart of a multiply instruction associated with arithmetic unit 40 of FIG. 2. While the method of the flow chart of FIG. 3 is applicable to arithmetic unit 40 of FIG. 2, it may be performed with other apparatuses. At step 50, a multiply instruction is received. The multiply instruction may be either of two types, depending on whether an operand has a value of either positive or negative one. In the embodiment shown in FIG. 2, recognition of the occurrence of a microinstruction having an operand with a value of either positive or negative one is performed by the microassembler. In another embodiment, an external assembler may itself recognize whether or not a multiply instruction has an operand with a value of either positive or negative one. In that case, the external assembler provides two different external instructions to data processor 30 depending on whether or not the multiply is to be performed with an operand having a value of either positive or negative one. Microcode memory 32 must thus perform different routines in response to the type of external instruction received. In yet another embodiment, as will be described with respect to FIG. 5, a block equivalent to decode block 41 of FIG. 2 recognizes the existence of a multiply instruction in which one operand is equal to either positive or negative one. In this case, neither the external assembler nor the microassembler need detect the type multiplication.

If the instruction is a multiply instruction in which the second operand is neither positive or negative one, then an instruction with a mnemonic labelled "mpy" is performed. At step 51, the two operands are provided as the A and B inputs, respectively. The sources of the operand, such as an on-chip register or an off-chip memory location, are also defined by the instruction. For example, a typical multiply instruction fetches the first operand from memory via the YDATA path, and the second operand from memory via the XDATA path. When both operands are valid at the inputs of multiplier/adder 45, at step 52, multiplier/adder 45 is activated. Multiplier/adder 45 performs the multiplication and provides the product at its output. The product is provided as RESULT at step 53, at which point the operation is complete.

If the second operand is recognized as having a value of positive or negative one, then an instruction with a mnemonic "mpyk" is recognized. At step 60, the first operand is provided to ALU 44 from a source defined by the instruction. ALU 44 is used instead of multiplier/adder 45, and multiplier/adder 45 remains inactive (powered-down). However, instead of providing the second operand to ALU 44, a zero is provided at step 61. If the most significant bit (MSB), or sign bit, of the second operand is not a binary one, then ALU 44 is enabled for addition at step 62. If the MSB of the second operand is a binary one, then at step 63 ALU 44 is enabled for subtraction. Then, regardless of the value of the MSB of the second operand, ALU 44 is activated at step 64. At step 65, the output of ALU 44 is provided as RESULT.

The effect of the addition performed in response to the mpyk instruction is the same as if a multiplication were performed. The product of a multiplication between the first operand and positive one is the first operand, which is equivalent to adding the first operand to zero. The result of a multiplication between the first operand and negative one is equal to a negative of the first operand, which is equivalent to substracting the first operand from zero. However, using ALU 44 instead of multiplier/adder 45 results in a significant reduction in power because multiplier/adder 45 is designed to perform complex multiplications quickly at the sacrifice of power.

In a typical digital signal processing (DSP) system, memory locations accessed by the YDATA path (providing the first operand) store variables used in real-time computation. In contrast, memory locations accessed by the XDATA path (providing the second operand) store constants used in frequently-encountered algorithms. Thus, the method of selectively using the mpyk algorithm based on the value of the second operand, and then either adding the first operand to zero or subtracting the first operand from zero in response to the sign bit of the second operand shown in FIG. 3, results in significant power savings.

Figure 4:
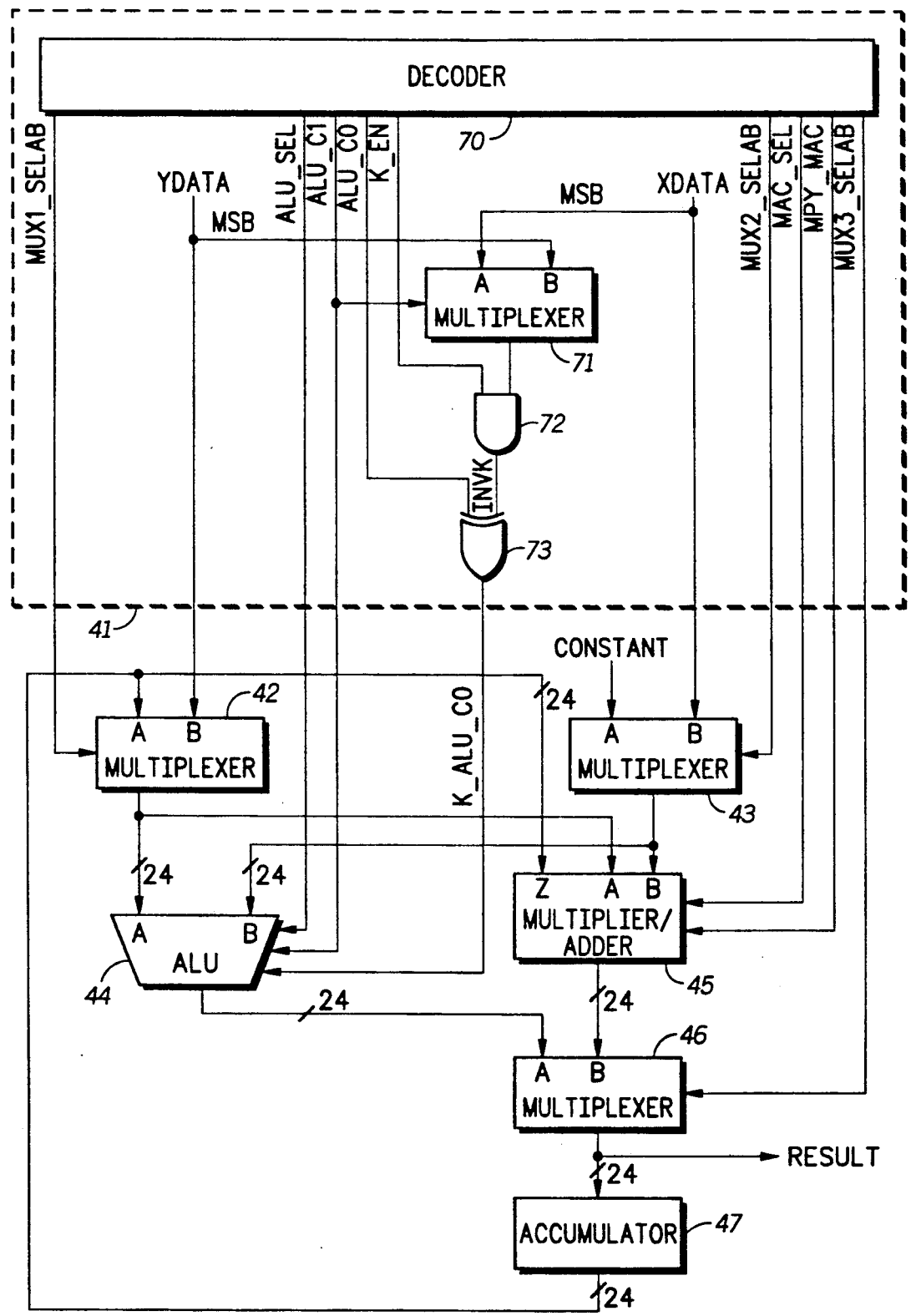
FIG. 4 illustrates in block form the arithmetic unit of FIG. 2 with additional detail.

FIG. 4 illustrates in block form arithmetic unit 40 of FIG. 2 with additional detail. Elements in common with FIG. 2 are similarly numbered. One difference between FIG. 4 and FIG. 2 is that FIG. 2 illustrates additional detail of decode block 41 and the control signals provided therefrom to the various blocks. Decode block 41 includes a decoder 70, a multiplexer 71, an AND gate 72, and an exclusive-OR gate 73. Decoder 70 provides signals labelled "MUX1_SELAB", "ALU_SEL", "ALU_""ALU_C0", "K_EN", "MUX2_SELAB", "MAC_SEL", "MPY/MAC", and "MUX3_SELAB". Multiplexer 71 has a first input terminal for receiving the MSB of a data element on the YDATA path, a second input terminal for receiving the MSB of a data element conducted on the XDATA path, and an output terminal. AND gate 72 has a first input terminal for receiving signal $K_{13}$ EN, a seocnd input terminal connected to the output terminal of multiplexer 71, and an output terminal providing an output signal labelled "INVK". Exclusive-OR gate 73 has a first input terminal for receiving signal ALU_CO, a second input terminal for receiving signal INVK, and an output terminal for providing a signal labelled "K_ALU_CO".

MUX1_SELAB is provided to multiplexer 42 to select between the data element conducted on the YDATA path, and the output of accumulator 24. ALU 44 receives three control signals, ALU_SEL, ALU_C1, and K_ALU_CO. In combination the three control signals determine the type of operation to be performed and enable ALU 44. Multiplier 45 receives signals MAC_SEL and MPY/MAC. MPY/MAC determines whether the Z input is to be used to add to the result of the current multiply operation. MAC_SEL activates multiplier 45. Signal MUX3_SELAB determines whether the output of ALU 44 or the output of multiplier 45 is to be provided as RESULT.

Decoder 70 provides the control signals in response to decoding a field of an instruction held by instruction register 33 of FIG. 2. In addition, multiplexer 71 and logic gates 72 and 73 provide an additional control signal to ALU 44 in response to the MSB of a selected second operand. TABLE I illustrates a truth table for the control signals provided by decode block 41 for various operations:

TABLE I

| Instruction mnemonic | K_EN | MUX1_SELAB | MUX2_SELAB | MAC_SEL | MPY/MAC | ALU_SEL | ALU_C1 | ALU_C0 | MUX3_SELAB |
|---|---|---|---|---|---|---|---|---|---|
| mpy A·B | 0 | 0 | 0 | 1 | 1 | 0 | X | X | 0 |
| mac A·B | 0 | 0 | 0 | 1 | 0 | 0 | X | X | 0 |
| add A+B | 0 | 0 | 0 | 0 | X | 1 | 0 | 0 | 1 |
| neg A | 0 | 1 | 0 | 0 | X | 1 | 1 | 1 | 1 |
| move A,acc | 0 | X | 0 | 0 | X | 1 | 1 | 0 | 1 |
| mpyk A,B | 1 | 1 | 0 | 0 | X | 1 | 1 | 0 | 1 |
| mack A,B | 1 | 0 | 1 | 0 | X | 1 | 0 | 0 | 1 | where in TABLE I A represents the first operand, typically read from the YDATA path, B represents the second operand, typically read from the XDATA path, "mpyk" represents a multiply instruction in which the B operand is equal to either positive or negative one, and "mack" represents a multiply-and-accumulate instruction in which the A operand is equal to positive or negative one.

Furthermore, TABLE II illustrates a truth table for the control signals of ALU 44 which is helpful in understanding their significance:

TABLE II

| ALU_SEL | SIGNAL ALU_C1 | K_ALU_C0 | ACTION |
|---|---|---|---|
| 1 | 0 | 0 | RESULT = A + B |
| 1 | 0 | 1 | RESULT = A − B |
| 1 | 1 | 0 | RESULT = PASS A TO OUTPUT |
| 1 | 1 | 1 | RESULT = B − A |
| 0 | X | X | POWER DOWN ALU |

If a multiplexer control signal is a binary 1, then the corresponding multiplexer outputs the A operand; if the control signal is a binary 0, then the corresponding multiplexer outputs the B operand. If signal MAC_SEL is equal to a binary 1, then if signal MPY/$\overline{\text{MAC}}$ is equal to a binary one then multiplier/adder 45 outputs (A·B); if signal MPY/$\overline{\text{MAC}}$ is equal to a binary 0, then multiplier/adder 45 outputs (Z+A·B). If signal MAC_SEL is equal to binary 0, then multiplier/adder 45 is powered down. Thus, when executing either the mpyk or mack instructions, the power consumed by high-speed multiplier/adder 45 is saved.

Figure 5:
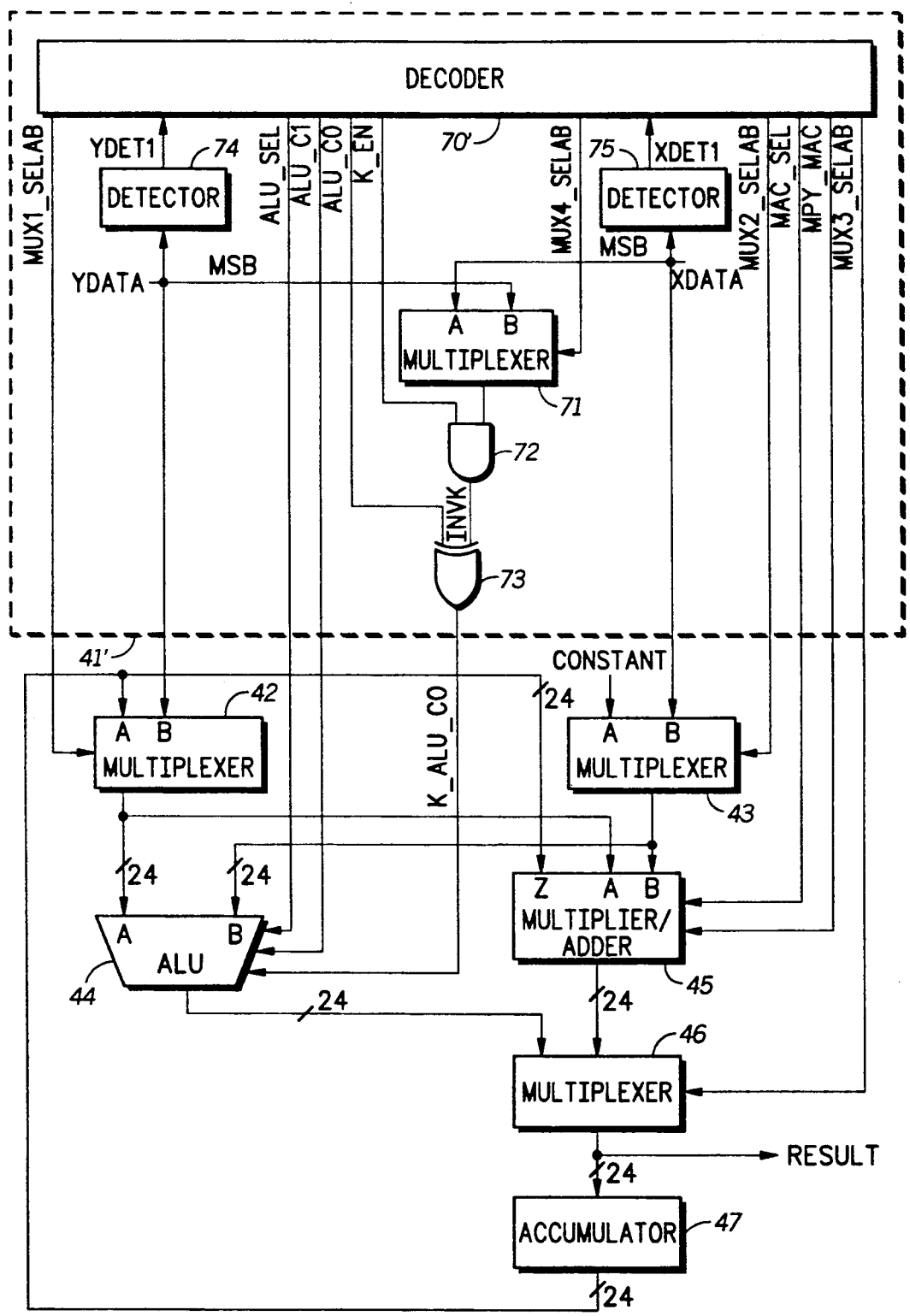
FIG. 5 illustrates a block diagram of an alternative embodiment of the arithmetic unit of FIGS. 2 and 3 in accordance with the present invention.

It is important to recognize that decode block 41 receives an instruction which is already encoded as "mpyk" or "mack". Thus, an assembler which compiles the microcode recognizes algorithms in which the second operand is equal to positive or negative one and provides the appropriate instruction, either mpyk or mack, in place of the instruction mpy or mac. However, other methods of determining that the second operand has a value of positive or negative one are possible. For example, FIG. 5 illustrates a block diagram of an alternative embodiment 40' of the arithmetic unit of FIGS. 2 and 4 in accordance with the present invention. Arithmetic unit 40' is identical to arithmetic unit 40 of FIG. 4 except that arithmetic unit 40' includes a decoder 70', and detectors 74 and 75. Detector 74 receives the first operand and provides a signal labelled "YDET1" if the value of the first operand is equal to either positive one or negative one. Detector 75 receives the second operand and provides a signal labelled "XDET1" if the value of the second operand is equal to either positive one or negative one. Decoder 70' provides control signals as illustrated in TABLE I except that an "mpyk" instruction is detected by receiving an "mpy" instruction with the XDATA path as the source of the second operand and with XDET1 asserted; and a "mack" instruction is detected by receiving an "mac" instruction with the YDATA path as the source of the first operand and with YDET1 asserted.

Figure 6:
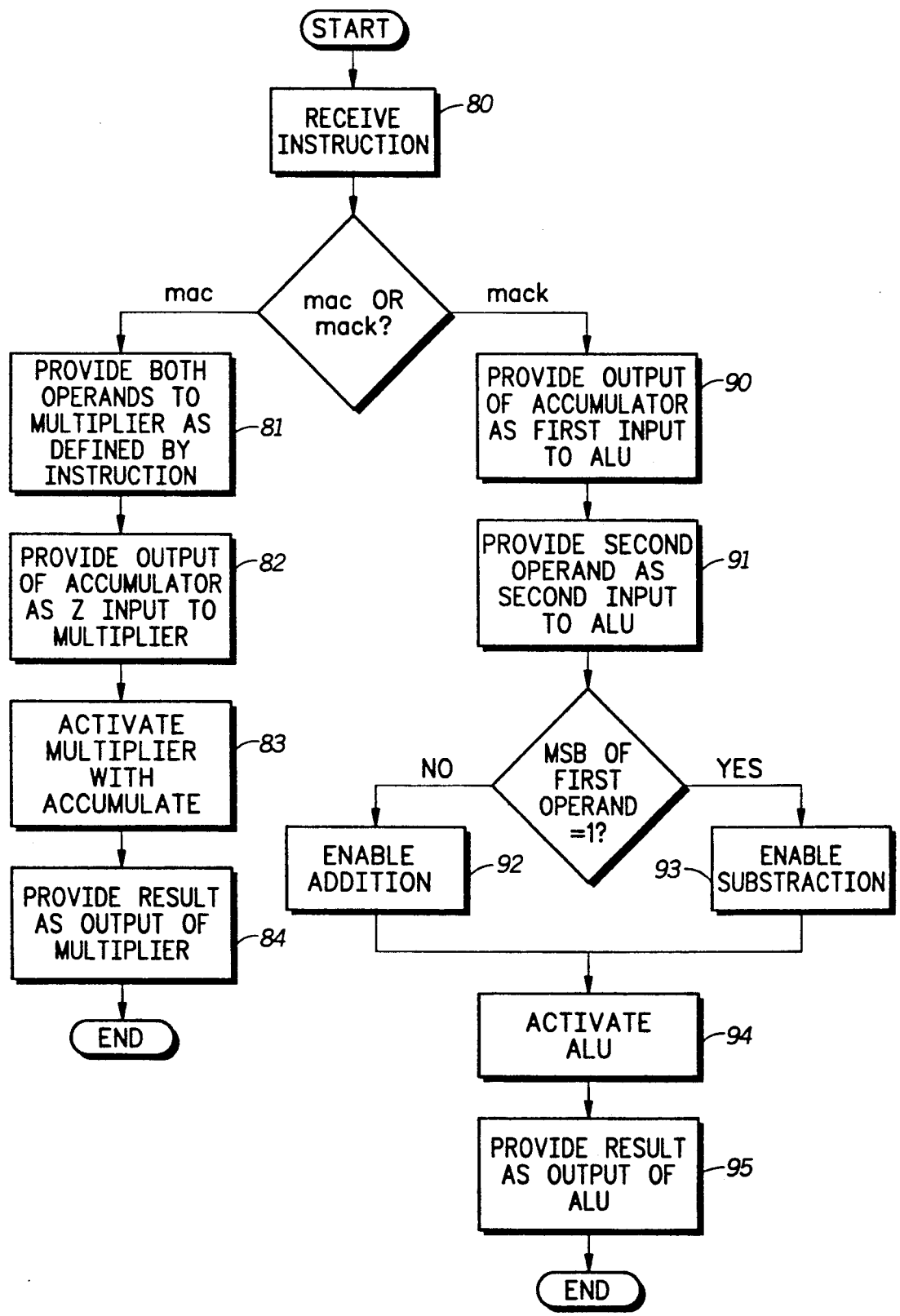
FIG. 6 illustrates a flow chart of a multiply and accumulate instruction associated with the arithmetic unit of FIGS. 2 and 4.

FIG. 6 illustrates a flow chart of a multiply and accumulate instruction associated with the arithmetic unit of FIGS. 2 and 4. After the instruction is received at step 80, a determination is made as to whether the instruction is a mac instruction or a mack instruction. It should be apparent that different ways of detecting whether an operand is positive one or negative one, including through a microcode assembler or with decode logic as illustrated in FIG. 5, are possible. In the case of a mac instruction, both operands are provided as the first and second operands of the operation at step 81. At step 82, a prior accumulated result is provided as the Z input of multiplier/adder 45. Then, at step 83, multiplier/adder 45 is enabled for multiply and accumulate operation and multiplier/adder 45 is activated. Finally, at step 84, RESULT is provided as the output of multiplier/adder 45.

If the instruction received is a mack instruction, then the output of accumulator 48 is provided as the A input of ALU 44 at step 90. Next, at step 91, the B input is provided via the XDATA path. If the MSB of the YDATA operand is not equal to one (the YDATA operand is a positive number), then addition between A and B is enabled at step 92. If, on the other hand, the MSB of the YDATA operand is equal to one (the YDATA operand is a negative number), then subtraction of the B operand from the A operand is enabled at step 93. Next, at step 94, ALU 44 is activated, and at step 95, the output of ALU 44 is provided as RESULT. Note that the only significant difference between the mack instruction and the mpyk instruction is that in the mack instruction, an operand is added to a previous result, instead of zero, in a manner determined by the sign bit of the operand.

It should be apparent by now that an arithmetic unit for performing multiply instructions with reduced power has been described. The arithmetic unit reduces power consumption by performing operations equivalent to multiplications between a variable and a known constant of either positive or negative one using circuitry which consumes less power than a conventional high-speed multiplier/adder. A method for performing multiply instructions between a variable and a constant having a value of either positive one or negative one with reduced power has also been described.

While the invention has been described in the context of a preferred embodiment, it will be apparent to those skilled in the art that the present invention may be modified in numerous ways and may assume many embodiments other than that specifically set out and described above. For example, many different arithmetic units may be constructed to practice the methods of FIGS. 3 and 6. Also, the arithmetic units of FIGS. 2, 4, and 5 perform additional functions besides the multiply operations described and to accomplish these additional operations different codings of control signals may be employed. The size of the operands may also be varied in other embodiments. Accordingly, it is intended by the appended claims to cover all modifications of the invention which fall within the true spirit and scope of the invention.

I claim:

1. An apparatus for performing multiplications with reduced power, comprising:
   an arithmetic logic unit for either, adding first and second inputs, or subtracting said second input from said first input, to provide an output thereof, in response to first and second predetermined states of first and second control signals, respectively, when enabled;
   means for providing both a first operand as said first input of said arithmetic logic unit, and a binary zero as said second input of said arithmetic logic unit, in response to a multiply instruction in which a second operand is equal to either positive one or negative one;
   decode means for providing said first and second control signals either in said first or said second predetermined logic states respectively in response to a sign bit of said second operand, and for enabling said arithmetic logic unit in response to a multiply instruction in which said second operand is equal to either positive one or negative one; and
   multiplexer means coupled to said arithmetic logic unit for providing said output of said arithmetic logic unit as a product of said first and second operands in response to a multiply instruction in which said second operand is equal to either positive one or negative one.

2. The apparatus of claim 1 further comprising:
   a multiplier for multiplying said first and second operands when enabled,
   said multiplexer means coupled to said multiplier and providing a result from either said arithmetic logic unit or said multiplier in response to a third control signal being in third or fourth predetermined states, respectively,
   said decode means further enabling said multiplier and providing said third control signal in said fourth predetermined state, in response to a multiply instruction in which said second operand is not equal to either positive one or negative one, and further providing said third control signal in said third predetermined state in response to said multiply instruction in which said second operand is equal to either positive one or negative one.

3. An apparatus for performing multiplications with reduced power, said multiplications including first and second multiply instructions between first and second operands, comprising:
   addition means and for adding the first operand to zero and for providing a first output in response when activated;
   subtraction means for subtracting the first operand from zero and for providing said first output in response when activated;
   a multiplier for multiplying the first and second operands and for providing a second output in response when activated;

multiplex means coupled to said addition means, to said subtraction means, and to said multiplier, for providing a result in response to a selected one output of said first and second outputs; and decode means coupled to said addition means, said subtraction means, and to said multiplier, for activating said multiplier in response to the first multiply instruction, for activating said addition means if a sign bit of the second operand is equal to a binary zero during the second multiply instruction, and for activating said subtraction means if a sign bit of the second operand is equal to a binary one during the second multiply instruction.

4. The apparatus of claim 3 wherein the second multiply instruction occurs when said second operand has a value of either positive one or negative one.

5. The apparatus of claim 3 wherein the first multiply instruction occurs when said second operand does not have a value of either positive one or negative one.

6. A method for performing multiplications with reduced power, the multiplications performed between first and second operands, comprising the steps of:

detecting a multiplication instruction in which the second operand has a value of positive one or negative one;

providing the first operand as a first input to an arithmetic logic unit;

providing zero as a second input to said arithmetic logic unit;

enabling said arithmetic logic unit for either addition or subtraction respectively in response to a positive or a negative value of a sign bit of said second operand;

activating said arithmetic logic unit; and providing an output of said arithmetic logic unit as a result of said multiplication.

7. The method for performing multiplications with reduced power of claim 6, further comprising the steps of:

detecting a multiplication instruction in which the second operand does not have a value of either positive one or negative one;

providing the first operand and the second operand respectively as first and second inputs to a multiplier;

activating said multiplier; and providing an output of said multiplier as said product of said multiplication.

8. An apparatus for performing a multiplication between first and second operands comprising:

an arithmetic logic unit having first and second inputs and an output;

a multiplier having first and second inputs and an output;

a multiplexer having first and second inputs respectively coupled to said output of arithmetic logic unit and to said output of said multiplier, and an output for providing a result of the multiplication; and decode means coupled to said arithmetic logic unit, to said multiplier, and to said multiplexer, for providing the first operand and zero respectively as said first and second inputs of said arithmetic logic unit, enabling said arithmetic unit for addition, and selecting said first input of said multiplexer in response to the second operand being positive one, for providing the first operand and zero respectively as said first and second inputs of said arithmetic logic unit, enabling said arithmetic unit for subtraction, and selecting said first input of said multiplexer in response to the second operand being negative one, and for providing the first and second operands as said first and second inputs of said multiplier, enabling said multiplier, and selecting said second input of said multiplexer in response to the second operand being different from either positive one or negative one.

* * * * *